(12) United States Patent
Kishi et al.

(10) Patent No.: US 9,296,047 B2
(45) Date of Patent: Mar. 29, 2016

(54) FIXING DEVICE FOR WORKPIECE IN MACHINE TOOL AND MACHINE TOOL HAVING THE FIXING DEVICE

(75) Inventors: Yoshinobu Kishi, Ome (JP); Tetsuya Takise, Nagano (JP); Akinobu Kanda, Ueda (JP); Yoshimi Saruta, Komoro (JP)

(73) Assignees: CITIZEN HOLDINGS CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 399 days.

(21) Appl. No.: 13/990,376

(22) PCT Filed: Nov. 14, 2011

(86) PCT No.: PCT/JP2011/076178
§ 371 (c)(1),
(2), (4) Date: Jun. 12, 2013

(87) PCT Pub. No.: WO2012/073683
PCT Pub. Date: Jun. 7, 2012

(65) Prior Publication Data
US 2013/0249174 A1  Sep. 26, 2013

(30) Foreign Application Priority Data
Nov. 30, 2010  (JP) ................................ 2010-266375

(51) Int. Cl.
*B23B 31/26* (2006.01)
*B23B 31/20* (2006.01)

(52) U.S. Cl.
CPC ............... *B23B 31/26* (2013.01); *B23B 31/205* (2013.01); *Y10T 279/1266* (2015.01); *Y10T 279/17307* (2015.01); *Y10T 279/17521* (2015.01); *Y10T 279/247* (2015.01)

(58) Field of Classification Search
CPC ...... B23B 31/204; B23B 31/205; B23B 31/26
USPC ............................ 279/4.06, 4.07, 4.09, 43, 50
See application file for complete search history.

(56) References Cited

U.S. PATENT DOCUMENTS 2,370,729 A    3/1945 Hoppe
2,392,999 A  * 1/1946 Redmer ................ B23B 31/204
                                                            279/4.04

(Continued)

FOREIGN PATENT DOCUMENTS

CN       1812860 A    8/2006
CN     101262971 A    9/2008

(Continued)

OTHER PUBLICATIONS

The first Office Action issued by the Chinese Patent Office on Aug. 29, 2014, which corresponds to Chinese Patent Application No. 201180057350.6 and is related to U.S. Appl. No. 13/990,376.

(Continued)

*Primary Examiner* — Eric A Gates
(74) *Attorney, Agent, or Firm* — Studebaker & Brackett PC (57) ABSTRACT

Wear of a sliding member is prevented or controlled in a portion of the sliding member at a specific angular position (phase) about an axis. A fixing device includes a chuck-actuating claw which rotates with a main spindle, and is displaced to open and close a chuck section, a rubber ring which rotates with the main spindle, and a bobbin (sliding member) which is provided to be movable between a first position and a second position along an axis direction of the main spindle, rotates with the rubber ring in contact with the rubber ring in the first position, rotates with the chuck-actuating claw while displacing the chuck-actuating claw in contact with the chuck-actuating claw in the second position, and does not have contact with both of the rubber ring and the chuck-actuating claw in a partial range between the first position and the second position.

6 Claims, 6 Drawing Sheets

(56) References Cited

U.S. PATENT DOCUMENTS

| | | | |
|---|---|---|---|
| 2,466,651 A | | 4/1949 | Zagar |
| 2,515,183 A | * | 7/1950 | Benjamin ............. B23B 31/204 279/4.09 |
| 3,042,418 A | | 7/1962 | Sorsa et al. |
| 3,727,930 A | * | 4/1973 | Anderson ............. B23B 31/207 279/43 |
| 3,741,572 A | * | 6/1973 | Nemoto ................ B23B 31/207 279/50 |
| 4,379,562 A | * | 4/1983 | Corbacho ............. B23B 31/205 279/5 |
| 2007/0057473 A1 | | 3/2007 | Pavey et al. |
| 2008/0224423 A1 | | 9/2008 | Hangleiter |
| 2010/0201083 A1 | | 8/2010 | Hangleiter |

FOREIGN PATENT DOCUMENTS

| | | |
|---|---|---|
| CN | 101743085 A | 6/2010 |
| JP | 40-017511 Y | 6/1965 |
| JP | 2660898 B | 6/1997 |

OTHER PUBLICATIONS

An Office Action; "Notice of Allowance," issued by the Korean Intellectual Property Office on Jul. 28, 2014, which corresponds to Korean Patent Application No. 10-2013-7016855 and is related to U.S. Appl. No. 13/990,376; with English language translation.
International Search Report; PCT/JP2011/076178; Dec. 13, 2011.

* cited by examiner

FIXING DEVICE FOR WORKPIECE IN MACHINE TOOL AND MACHINE TOOL HAVING THE FIXING DEVICE

TECHNICAL FIELD

The present invention relates to a fixing device for a workpiece in a machine tool and a machine tool having the fixing device, in particular, to an improvement in contact between an actuating lever and a sliding member.

BACKGROUND ART

A machine tool such as a lathe conventionally includes a fixing device (hereinafter referred to as a chucking device), which fixes a workpiece such as a round bar in a main spindle.

The chucking device includes a fixing section which rotates with a main spindle, fixes a workpiece in a closed state, and releases the fixation of the workpiece in an open state, an actuating lever which rotates with the main spindle, and is displaced so as to open and close the fixing section, and a sliding member which is provided to be movable between the first position and the second position along the axis direction of the main spindle, rotates with the actuating lever while displacing the actuating lever in contact therewith in the second position in the movable range, and does not have contact with the actuating lever in the first position.

The fixing section is closed when the sliding member is in the second position and the fixing section opens when the sliding member is in the first position.

The sliding member hardly rotates when the sliding member does not have contact with the actuating lever, or the sliding member rotates by accompanying rotation owing to slight contact with the outer circumferential surface of the main spindle. For this reason, the difference between the rotation of the sliding member and the rotation of the actuating lever rotating with the main spindle is increased, resulting in a problem in that the sliding member becomes worn away in the rotation direction due to such a large difference in rotation speeds when the sliding member has contact with the actuating lever.

It is therefore proposed to always rotate the sliding member integrally with the main spindle by providing a brake member between the sliding member and the main spindle in order to avoid relative movement between the sliding member and the main spindle (Patent Document 1).

With this technique, the sliding member always rotate integrally with the main spindle by the brake member provided between the main spindle (spindle in Patent Document 1) and the sliding member (shifter in Patent Document 1). On the other hand, the actuating lever (chuck claw) always rotates integrally with the main spindle, so that the rotation speeds of both of the sliding member and the actuating lever are the same when the sliding member has contact with the actuating lever. Therefore, the wear in the rotation direction can be prevented or controlled because the sliding member and the actuating lever do not have a difference in speeds.

RELATED ART DOCUMENT

Patent Document

Patent Document 1: JP 2660898B

SUMMARY OF INVENTION

Technical Problem

The actuating lever is provided in a specific angular position (phase) around the main spindle, and the sliding member and the main spindle are integrally formed in the invention described in the above-described patent document. For this reason, an angular position (phase) around an axis in a portion of the sliding member which has contact with the actuating lever is always fixed, and only the portion in the angular position which has contact with the actuating lever repeats the contact, so that wear extending in the axis line direction easily occur in the portion having a specific phase.

The present invention has been made in view of the above circumstances, and an object of the present invention is to provide a fixing device for a workpiece in a machine tool, which can prevent or control wear extending in the axis line direction in a portion of a sliding member having a specific angular position (phase) around an axis while preventing or controlling the wear of the sliding member in the rotation direction, and a machine tool having the fixing device.

Solution to Problem

A fixing device for a workpiece in a machine tool according to the present invention can prevent or control wear of a sliding member in rotation direction by the contact with an actuating lever in a state in which the sliding member rotates by inertia or accompanying rotation without rotation integral with a main spindle in a range before the sliding member has contact with the actuating lever while rotating the sliding member which has contact with the actuating lever in synchronization with the main spindle, and can also prevent or control wear extending in the axis direction in a portion of the sliding member which has contact with the actuating lever by preventing a specific fixed position of an angular position (phase) around the main spindle.

Namely, the fixing device for a workpiece in a machine tool according to the present invention includes a fixing section configured to rotate with a main spindle, fix the workpiece in a closed state, and release the fixation of the workpiece in an open state, an actuating lever configured to rotate with the main spindle, and be displaced so as to open and close the fixing section, a sliding member which is provided to be movable between a first position and a second position along an axis direction of the main spindle, and configured to rotate with the actuating lever while displacing the actuating lever in contact with the actuating lever in the second position in the movable range, and a rotation transfer member which is disposed to have contact with the sliding member in the first position in the movable range of the sliding member, and configured to rotate with the main spindle, wherein the sliding member, the rotation transfer member and the actuating lever are disposed or formed such that the sliding member does not have contact with either the rotation transfer member and the actuating lever at least in a partial range between the first position and the second position of the sliding member.

Moreover, a machine tool according to the present invention includes the fixing device according to the present invention.

Effect of Invention

According to the fixing device for a workpiece in a machine tool according to the present invention, the occurrence of wear extending in the axis direction can be prevented or controlled in a portion of the sliding member at a specific angular position (phase) around an axis while preventing or controlling the wear of the sliding member in the rotation direction.

According to the machine tool of the present invention, the occurrence of wear extending in the axis direction can be prevented or controlled in a portion of the sliding member at a specific angular position (phase) around an axis while preventing or controlling the wear of the sliding member in the rotation direction.

DESCRIPTION OF EMBODIMENT

Hereinafter, an embodiment of a fixing device (hereinafter referred to as chucking device) which fixes a workpiece in a machine tool according to the present invention and a machine tool having the chucking device will be described with reference to the drawings.

(Configuration)

Figure 1:
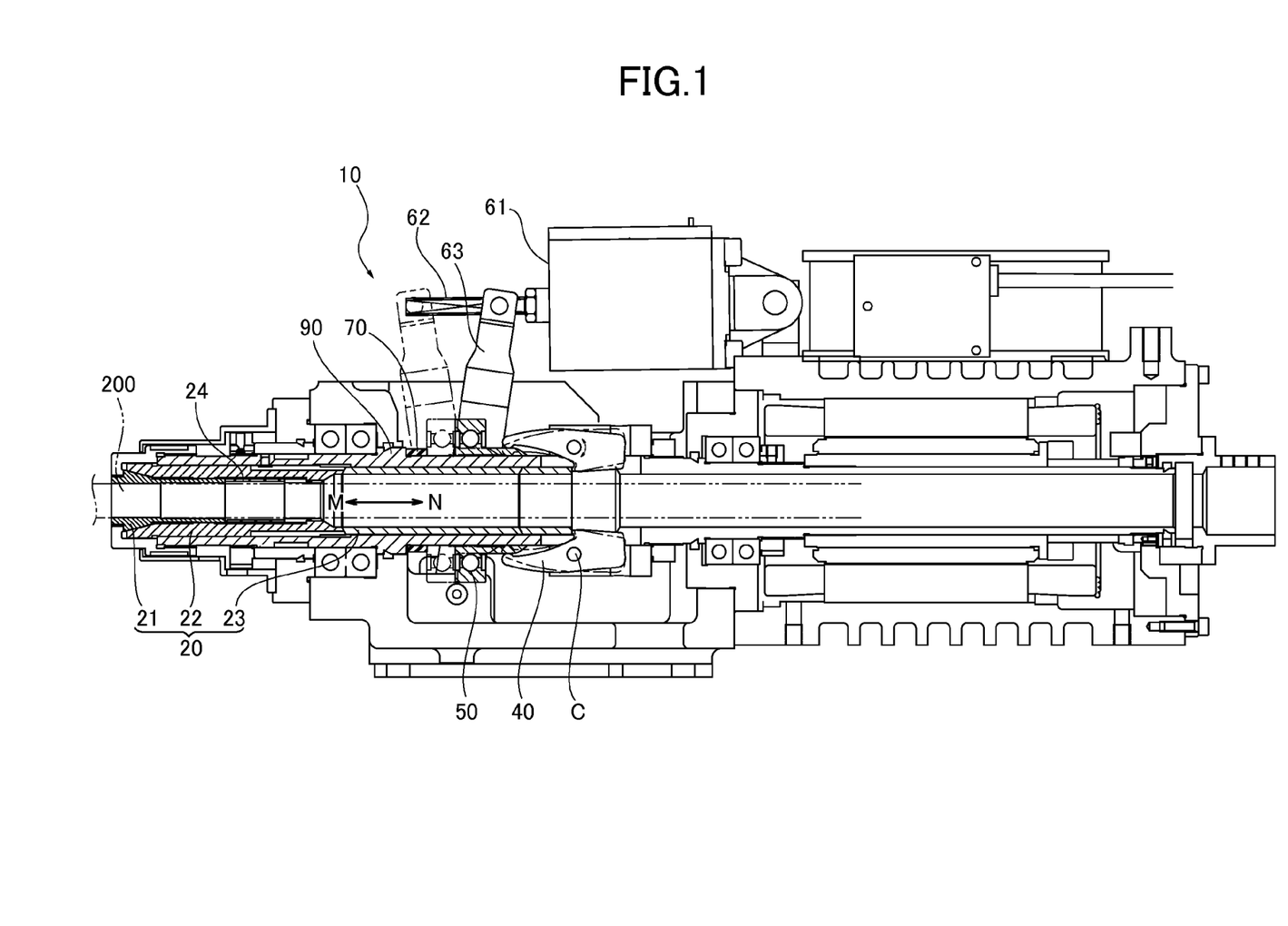
FIG. 1 is a view illustrating a main spindle portion and a chucking device as a fixing device for an automatic lathe as a machine tool according to the present invention.

FIG. 1 is a sectional view illustrating a chucking device 10 which fixes a workpiece 200 in a rotary main spindle 90 of an automatic lathe as a machine tool.

The chucking device 10 is a chucking device by a collet chuck. The chucking device 10 includes a chuck section 20 (fixing section) which rotates with the main spindle 90, fixes the workpiece 200 in a closed state, and releases the fixation of the workpiece 200 in an open state, a chuck-actuating claw 40 (actuating lever) which rotates with the main spindle 90, and swings about a supporting point C to open and close the chuck section 20, a rubber ring 70 (rotation transfer member, elastic member) which rotates with the main spindle 90, and a bobbin 50 (sliding member) which is provided to be movable between the after-described first position P1 and second position P2 along the axis direction of the main spindle 90, rotates with the rubber ring 70 in contact with the rubber ring 70 in the first position in the movable range, rotates with the chuck-actuating claw 40 while displacing the chuck-actuating claw 40 in contact therewith in the second position P2 in the movable range, and does not have contact with both of the rubber ring 70 and the chuck-actuating claw 40 at least in a partial range in the range between the neighborhood of the first position P1 and the neighborhood of the second position P2.

The configuration of the chuck section 20 is generally known, and includes a collet 21 which fixes the workpiece 200 from the outward portion of the outer circumferential surface thereof in a closed state in which the collet 21 is bent inward in the radial direction of the main spindle 90, a first sleeve 22 which is provided in the outside of the outer circumference of the collet 21, and is displaced in the axis direction M of the main spindle 90 by a taper formed in the inner circumferential surface of the first sleeve 22, which runs on a taper formed in the outer circumferential surface of the collet 21 so as to bend the collet 21 as described above, and a second sleeve 23 which pushes the first sleeve 22 in the axis direction M.

In the present embodiment, the first sleeve 22 and the second sleeve 23 are a two-body configuration arranged side by side on the straight line along the axis direction MN of the main spindle 90, but these two sleeves 22, 23 can be integrally formed.

On the other hand, the collet 21 receives a biasing force which is pushed in the axis direction M of the main spindle 90 by a coil spring 24, and opens so as to release the fixation of the workpiece 200 by the loss of the inward bending in the radial direction of the main spindle 90 by the own elastic restoring force of the collet 21 because the load received from the taper of the first sleeve 22 is reduced when the first sleeve 22 and the second sleeve 23 are not displaced in the axis direction M.

Figure 2:
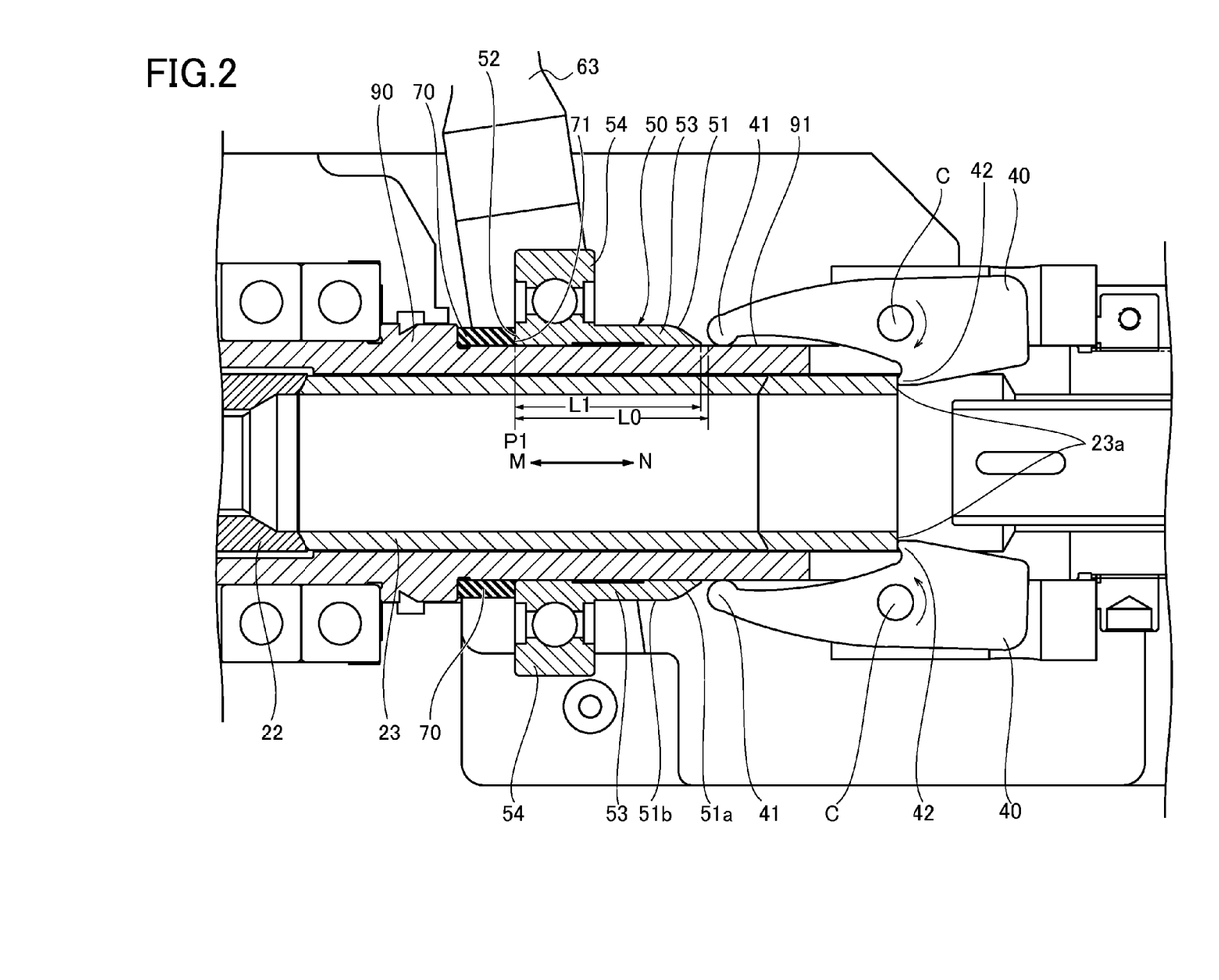
FIG. 2 is a sectional view illustrating the details of the fixing device in FIG. 1 and a state in which a bobbin is in a first position.

The chuck-actuating claw 40 rotates integrally with the main spindle 90. A plurality of chuck-actuating claws 40 is provided at equal intervals along the circumferential direction of the main spindle 90 as illustrated in FIG. 2, and swings about the supporting point C. A first end portion 41 of each chuck-actuating claw 40 is positioned on the outer circumferential surface 91 side of the main spindle 90, and a second end portion 42 opposite to the first end portion 41 across the supporting point C faces a back end surface 23a of the second sleeve 23 in contact therewith at all times.

Each of the chuck-actuating claws 40 is biased by a not-shown biasing force such that the first end portion 41 has contact with the outer circumferential surface 91 of the main spindle 90. In a state in which the first end portion 41 has contact with the outer circumferential surface 91 of the main spindle 90, the sleeves 22, 23 are moved in the direction of the chuck-actuating claw 40 by the coil spring 24, and the second end portion 42 has contact with the back end surface 23a of the second sleeve 23. On the other hand, when the first end portion 41 separates from the outer circumferential surface 91 of the main spindle 90 against the biasing force, the second end portion 42 pushes the back end surface 23a of the second sleeve 23 in the axis direction M of the main spindle 90, and displaces the second sleeve 23 in the axis direction M.

By the displacement of the second sleeve 23 in the axis direction M, the first sleeve 22 is integrally displaced in the axis direction M, and the collet 21 is bent, so that the workpiece 200 is fixed.

In addition, when the sleeves 22, 23 are moved in the direction of the chuck-actuating claw 40 (axis direction N), the fixation of the workpiece 200 by the collet 21 is released.

The rubber ring 70 is pressed to the outer circumferential surface 91 of the main spindle 90, is provided on the side opposite to the chuck-actuating claw 40 across the bobbin 50, and rotates integrally with the main spindle 90.

The bobbin 50 is provided in the outer circumferential surface 91 of the main spindle 90 to be slidable in the axis direction MN of the main spindle 90. The length L1 of the bobbin 50 along the axis direction MN is set to be slightly shorter than the length L0 between an end surface 71 (hereinafter back end surface 71) of the rubber ring 70 on the side close to the chuck-actuating claw 40 and the first end portion 41 of the chuck-actuating claw 40 (L1<L0).

A cylinder 61 as a driving source illustrated in FIG. 1 displaces a shaft 62 along the axis direction MN by a command from outside. A driving lever 63 is rotatably supported on one end side and is supported to the shaft 62 on the other end.

The driving lever 63 engages with the bobbin 50. The driving lever 63 slides the bobbin 50 in the axis direction MN along the outer circumferential surface 91 of the main spindle 90 in accordance with the displacement of the shaft 62 of the cylinder 61 in the axis direction MN.

In addition, the bobbin 50 loosely engages with the outer circumferential surface 91 of the main spindle 90, but the bobbin 50 may rotate in synchronization with the main spindle 90 as described below. For this reason, an inside portion 53 of the bobbin 50 adjacent to the outer circumferential surface 91 of the main spindle 90 and an outside portion 54 of the bobbin 50 are relatively rotatable through ball bearings, and the non-rotary driving lever 63 is supported by the outside portion 54.

The inside portion 53 of the bobbin 50 is formed such that a part of the inside portion 53 on the side close to the chuck-actuating claw 40 projects toward the chuck-actuating claw 40, and the outer circumferential surface of the projected portion is a cam surface 51 which has contact with the first end portion 41 of the chuck-actuating claw 40.

A part of the cam surface 51 on the side close to the first end portion 41 of the chuck-actuating claw 40 is formed as a tapered surface 51a (tapered surface in sectional view) on which the first end portion 41 runs. A horizontal surface 51b (horizontal surface in sectional view) having a fixed height on which the first end portion 41 runs is formed following the tapered surface 51a.

Figure 3:
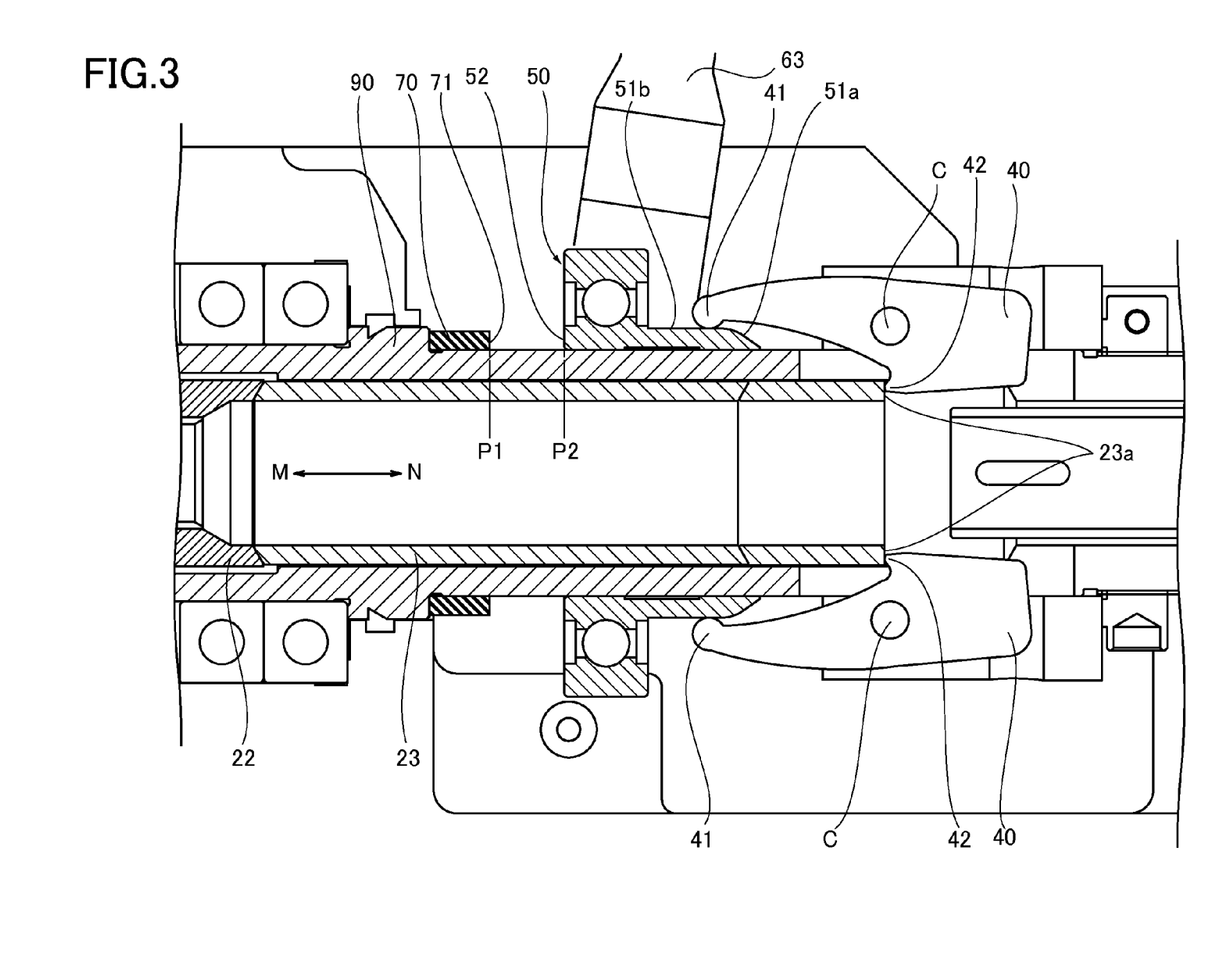
FIG. 3 is a sectional view illustrating the details of the fixing device in FIG. 1 and a state in which the bobbin is in a second position.

The slidable range of the bobbin 50 is within a range in which the bobbin 50 is moved by the driving lever 63, and is a range between a position where the end surface 52 (hereinafter referred to as leading end surface 52) of the bobbin 50 on the side close to the rubber ring 70 is pressed to the back end surface 71 of the rubber ring 70 (position where the leading end surface 52 of the bobbin 50 has close contact with the back end surface 71 of the rubber ring 70 with an elastic force obtained by slightly elastic-deforming the rubber ring 70, and the bobbin 50 has contact with the rubber ring 70 by a frictional force resulting from the elastic force with no slip between the bobbin 50 and the rubber ring 70: hereinafter referred to as first position P1) and a position (hereinafter referred to as second position P2) corresponding to a state in which the first end portion 41 of the chuck-actuating claw 40 runs on the horizontal surface 51b of the cam surface 51 of the bobbin 50 in the axis direction N as illustrated in FIG. 3.

Then, when the first end portion 41 of the chuck-actuating claw 40 runs on the cam surface 51 of the bobbin 50, the first end portion 41 is displaced outward in the radius direction of the main spindle 90, the chuck-actuating claw 40 rotates about the supporting point C in accordance with the displacement of the first end portion 41, the second end portion 42 pushes the back end surface 23a of the second sleeve 23, and the second sleeve 23 is displaced in the axis direction M. Such displacement is increased in accordance with an increase in the running height on the tapered surface 51a, and the fixing operation of the workpiece 200 by the above-described collet 21 is completed in a state in which the first end portion 41 of the chuck-actuating claw 40 runs on the horizontal surface 51b of the bobbin 50.

(Function)

According to the chucking device 10 of the above-described embodiment, in response to a command which releases the fixation of the workpiece 200 to the cylinder 61, the driving lever 63 is moved in the axis direction M, and at this time, the bobbin 50 is located in the first position P1 (refer to FIG. 2) by the driving lever 63.

The leading end surface 52 of the bobbin 50 is pressed to the back end surface 71 of the rubber ring 70 rotating integrally with the main spindle 90 in the first position P1. The inside portion 53 of the bobbin 50 therefore rotates with the rubber ring 70, namely, in synchronization with the rotation of the main spindle 90.

Figure 4:
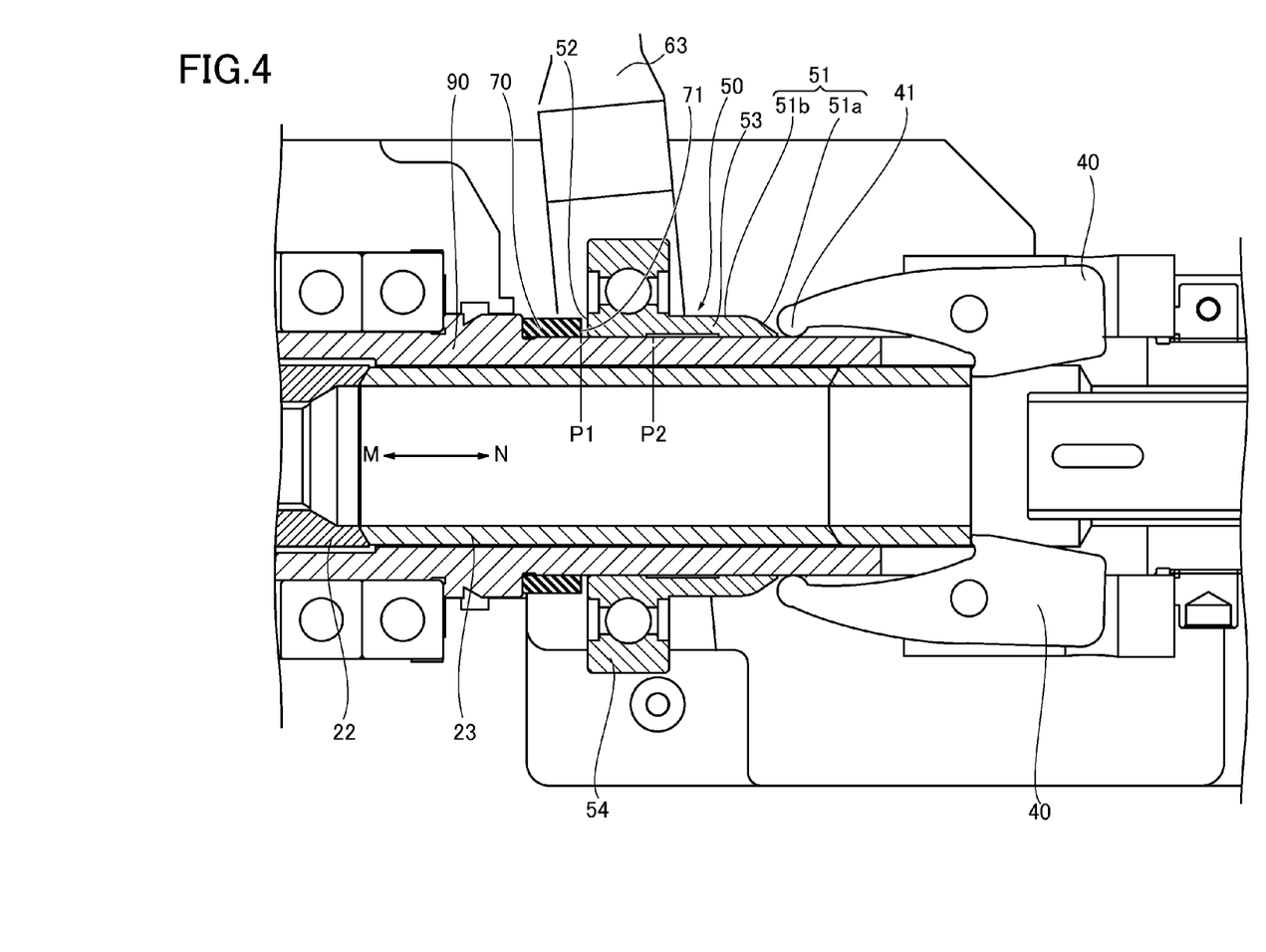
FIG. 4 is a sectional view illustrating the details of the fixing device in FIG. 1 and a state in which the bobbin is in a partial range between the first position and the second position.

After that, in response to a command which fixes the workpiece 200 to the cylinder 61, the driving lever 63 is moved in the axis direction N, and the bobbin 50 is displaced from the first position P1 toward the second position P2 (FIG. 3) by the driving lever 63. However, the bobbin 50 does not have contact with both of the rubber ring 70 and the chuck-actuating claw 40 in a range from the position just after the leading end surface 52 of the bobbin 50 separates from the back end surface 71 of the rubber ring 70 to the position just before the tapered surface 51a of the inside portion 53 of the bobbin 50 has contact with the first end portion 41 of the chuck-actuating claw 40 as illustrated in FIG. 4 (the partial range: a range from the position adjacent to the first position P1 to the difference (L0−L1) along the axis direction N in the range between the first position P1 and the second position P2) because the length L1 of the inside portion 53 of the bobbin 50 along the axis direction MN is set to be slightly shorter than the length L0 between the back end surface 71 of the rubber ring 70 and the first end portion 41 of the chuck-actuating claw 40 (L1<L0).

Therefore, the driving force which rotates the bobbin 50 is lost, and the bobbin 50 rotates by the inertia in the rotation in synchronization with the rubber ring 70. However, the rotation speed is lowered due to a resistance of the ball bearing of the bobbin 50 or the like because the bobbin 50 loosely engages with the outer circumferential surface 91 of the main spindle 90, so that the bobbin 50 rotates at a speed slightly slower than the rotation speed of the main spindle 90.

In this regard, the rotation of the bobbin 50 is not rotation which is completely synchronized with the rotation of the main spindle 90 as in a state in which the bobbin 50 is pressed to the rubber ring 70 in the first position P1. The bobbin 50 therefore differs from the rotary main spindle 90 in a phase.

When the bobbin 50 is further displaced in the axis direction N, and the tapered surface 51a of the inside portion 53 of the bobbin 50 begins to contact with the first end portion 41 of the chuck-actuating claw 40 rotating in synchronization with the main spindle 90, the bobbin 50 rotates with the chuck-actuating claw 40, namely, in synchronization with the rotation of the main spindle 90 by the contact between the tapered surface 51a and the first end portion 41 of the chuck-actuating claw 40.

The rotation speed of the bobbin 50 is slower than the rotation speed of the main spindle 90, namely, the rotation speed of the chuck-actuating claw 40 at the moment that the bobbin 50 has contact with the chuck-actuating claw 40, but the speed difference is remarkably smaller than the speed difference when the bobbin 50 has contact with the chuck-actuating claw 40 in a state in which the bobbin 50 is stopped or the bobbin 50 simply rotates accompanying with the rotation of the main spindle 90.

Consequently, the wear in the rotation direction generated in the contact portion between the bobbin 50 and the chuck-actuating claw 40 can be significantly reduced compared to the wear in the rotation direction generated in the contact portion in which the bobbin has contact with the chuck-actuating claw in a state in which the bobbin is stopped or the bobbin 50 rotates accompanying the rotation of the main spindle 90.

In the chucking device 10 of the present embodiment, different from the chucking device which integrally rotates the bobbin and the main spindle at all times by providing between the bobbin and the main spindle the brake member which prevents the relative rotation between the bobbin and the main spindle as in the invention described in the prior art document, although the rotation speed of the bobbin 50 slightly differs from the rotation speed of the chuck-actuating claw 40 in the contact between the bobbin 50 and the chuck-actuating claw 40, the speed difference is very small, so that the wear due to the slight speed difference can be significantly reduced.

On the other hand, in the range from the separation of the bobbin 50 from the rubber ring 70 to the beginning of the contact of the bobbin 50 with the chuck-actuating claw 40, the bobbin 50 independently rotates out of synchronization with the main spindle 90. The position (angular position about axis) of the tapered surface 51a in which the bobbin 50 has contact with the chuck-actuating claw 40 is thereby changed in each contact.

Thus, in the chucking device 10 of the present embodiment, different from a prior art which integrally rotates the bobbin and the main spindle at all times by providing between the bobbin and the main spindle the brake member which prevents the relative rotation between the bobbin and the main spindle, the position (angular position around axis (phase)) in the tapered surface 51 a with which the first end portion 41 of the chuck-actuating claw 40 has contact in the contact between the bobbin 50 and the chuck-actuating claw 40 is not constant, so that the focused wear in a specific portion can be prevented or controlled.

In addition, the bobbin 50 rotates integrally with the main spindle 90, and is further moved in the axis direction N by the driving lever 63. The contact position of the first end portion 41 of each chuck-actuating claw 40 is moved to the horizontal surface 51b from the tapered surface 51a of the bobbin 50, and the movement of the bobbin 50 in the axis direction N is stopped in the previously set second position P2 (FIG. 3), and thus, the fixing operation of the workpiece 200 is completed.

After the fixing operation of the workpiece 200 is completed, in response to a command which releases the fixation of the workpiece 200 to the cylinder 61, the driving lever 63 is moved in the axis direction M, and at this time, the bobbin 50 is displaced in the axis direction M from the second position P2 toward the first position P1.

At this time, the bobbin 50 is displaced by an operation opposite to the operation which displaces the bobbin 50 in the axis direction N from the first position P1 to the second position P2, and the bobbin 50 is out of synchronization with the rotation of the main spindle 90 when the tapered surface 51a of the bobbin 50 separates from the first end portion 41 of the chuck-actuating claw 40 (FIG. 4). When the leading end surface 52 of the bobbin 50 has contact with the back end surface 71 of the rubber ring 70, the bobbin 50 rotates integrally with the rubber ring 70 by a friction force with the rubber ring 70, and the bobbin 50 again rotates in synchronization with the rotation of the main spindle 90.

In addition, when the leading end surface 52 of the bobbin 50 has contact with the back end surface 71 of the rubber ring 70, the bobbin 50 slightly differs from the rubber ring 70 in a rotation speed, and the rubber ring 70 as an elastic member is elastically deformed by the speed difference at a moment that the rubber ring 70 has contact with the bobbin 50, but the impact in the contact due to the speed difference between the bobbin 50 and the rubber ring 70 can be reduced by such elastic deformation of the rubber ring 70.

Then, after the bobbin 50 is moved to the first position P1, the movement of the bobbin in the axis direction M is stopped (refer to FIG. 2), and the operation which releases the fixation of the workpiece 200 can be completed.

As described above, according to the chucking device 10 of the present embodiment, the wear in a part of the bobbin 50 which has contact with the chuck-actuating claw 40 can be reduced, and the contact portion of the chuck-actuating claw can be dispersed such that a part of the bobbin 50 with which the chuck-actuating claw 40 has contact does not focus on a fixed part. Therefore, the focused wear in a specific portion can be prevented or controlled.

In the chucking device 10 of the present embodiment, the rubber ring 70 as an elastic member is applied to the bobbin 50 in the first position P1, which rotates with the main spindle 90, as a rotation transfer member which transfers the rotation of the main spindle 90. However, in the fixing device of the present invention, the rotation transfer member is not limited to the rubber ring 70 as long as it transfers the rotation of the main spindle to the sliding member (bobbin 50) in the first position. It can be an elastic member made of an elastic material except rubber, or a member made of a material except an elastic material.

(Modified Example)

Figure 5:
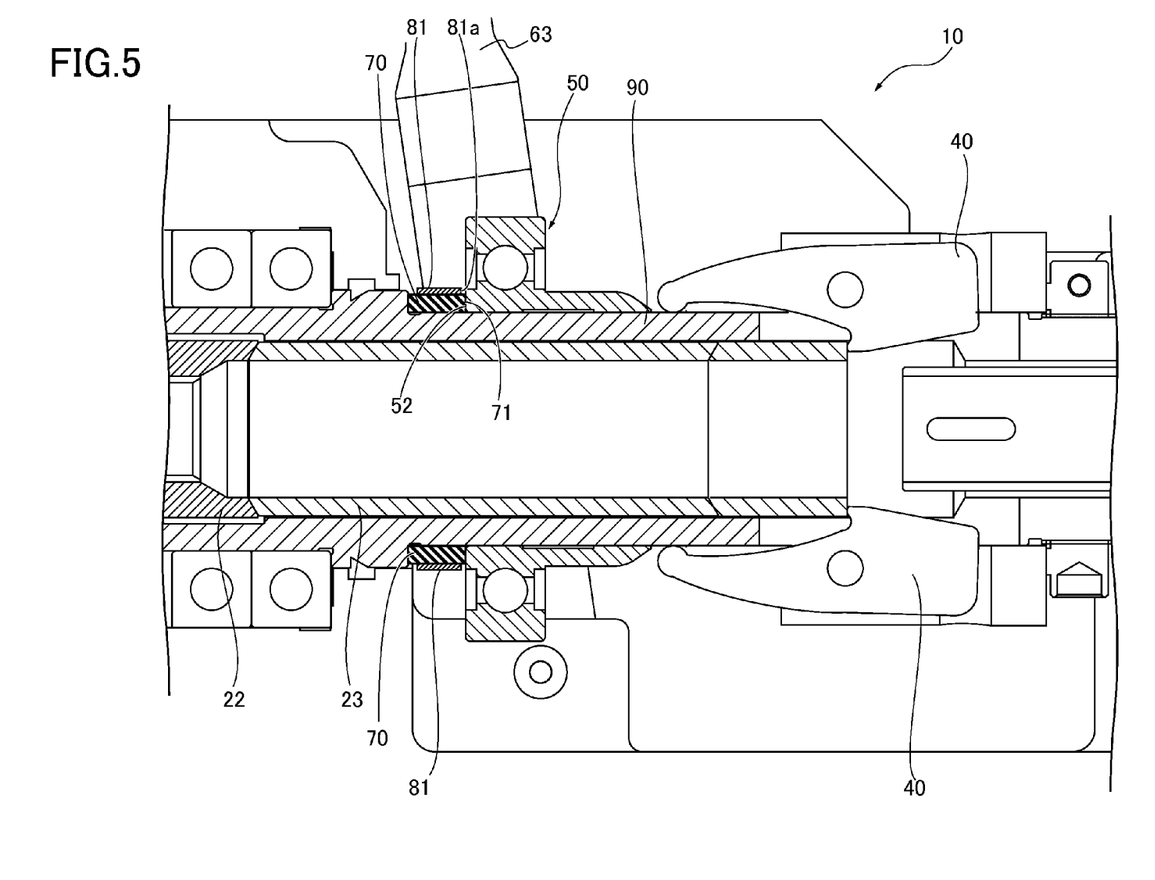
FIG. 5 is a sectional view illustrating a modified example (part 1) in which an outward portion of an outer circumference of a rubber ring is covered by an outer circumference ring.

A chucking device 10 illustrated in FIG. 5 is a modified example of the chucking device 10 of the above-described embodiment. This modified example is one embodiment of the fixing device of the present invention.

In the chucking device 10 of the modified example, an outer circumference ring 81 (circular member) which prevents or controls the outward elastic deformation of the rubber ring 70 is added in the outside of the outer circumference of the rubber ring 70 in the chucking device 10 of the above-described embodiment.

As described above, a member except the rubber ring 70 can be applied as the rotation transfer member, but when the rubber ring 70 of the above-described embodiment, in particular, a rubber ring in which the thickness in the radial direction is thin, and the inside diameter is slightly smaller than the radius of the outer circumferential surface 91 of the main spindle 90 is used, the rubber ring 70 extends along the circumferential direction by a centrifugal force acting outward in the radial direction in response to an increase in the rotation speed of the main spindle 90. As a result, the contact pressure between the inner circumferential surface of the rubber ring 70 and the outer circumferential surface 91 of the main spindle 90 is reduced, and the rubber ring 70 may not appropriately transfer the rotation of the main spindle 90 to the bobbin 50.

However, in the chucking device 10 of the modified example illustrated in FIG. 5, the outer circumference ring 81 provided in the outside of the outer circumference of the rubber ring 70 prevents or controls the outward elastic deformation of the rubber ring 70, so that a decrease in the contact pressure between the outer circumferential surface 91 of the main spindle 90 and the inner circumferential surface of the rubber ring 70 can be prevented or controlled even if the main spindle 90 rotates at a high speed. As a result, the rubber ring 70 can appropriately transfer the rotation of the main spindle 90 to the bobbin 50.

Any outer circumference ring can be used as the outer circumference ring 81 as long as it is made of a material which does not easily deform by a centrifugal force acting by the rotation speed of the main spindle 90. Various rings made of metal, resin, FRP reinforced by carbon fiber, or the like can be applied.

It is preferable for the inner circumferential surface of the outer circumference ring 81 to have contact with the outer circumferential surface of the rubber ring 70 without a centrifugal force. When the inner circumferential surface of the outer circumference ring 81 and the outer circumferential surface of the rubber ring 70 have a space therebetween, the rubber ring 70 is displaced outward in the radius direction by the space. For this reason, the contact pressure between the rubber ring 70 and the main spindle 90 is reduced. However, as long as the inner circumferential surface of the outer circumference ring 81 has contact with the outer circumferential surface of the rubber ring 70 without a centrifugal force, the rubber ring 70 cannot be displaced outward in the radius direction even if a centrifugal force acts on the rubber ring 70. Therefore, it is apparent that the outer circumference ring 81 can prevent a decrease in the contact pressure between the rubber ring 70 and the main spindle 90.

In addition, it is preferable for an end edge 81a of the outer circumference ring 81 on the side of the back end surface 71 of the rubber ring 70 not to project from the back end surface 71 of the rubber ring 70 in a length range of the outer circumference ring 81 along the axis direction MN.

Namely, if the end edge 81a of the outer circumference ring 81 projects from the back end surface 71 of the rubber ring 70, the projected end edge 81a hits the leading end surface 52 of the bobbin 50 prior to the back end surface 71 of the rubber ring 70 when the bobbin 50 is displaced in the axis direction M. For this reason, the function which eases the impact in the contact by the rubber ring 70 cannot be exerted, and the bobbin 50 cannot be further displaced in the axis direction M, so that the crimping force (contact pressure) between the rubber ring 70 and the bobbin 50 cannot be significantly ensured.

However, when the end edge 81a of the outer circumference ring 81 is in a state which retracts from the back end surface 71 of the rubber ring 70 (a state in which the end edge 81a is located on the axis direction M side of the back end surface 71 as illustrated in FIG. 5), after the leading end surface 52 of the bobbin 50 has contact with the back end surface 71 of the rubber ring 70, the bobbin 50 is displaced in the axis direction M side in the elastic deformation range of the rubber ring 70 to be reached to the first position P1. The crimping force (contact pressure) between the rubber ring 70 and the bobbin 50 is therefore sufficiently ensured.

In addition, the outer circumference ring 81 illustrated in FIG. 5 is a circular body having a constant inner diameter and a constant outer diameter. However, an outer circumference ring 82 as a step circular body having different inner diameters and different outer diameters illustrated in FIG. 6, for example, can be applied instead of the outer circumference ring 81.

Figure 6:
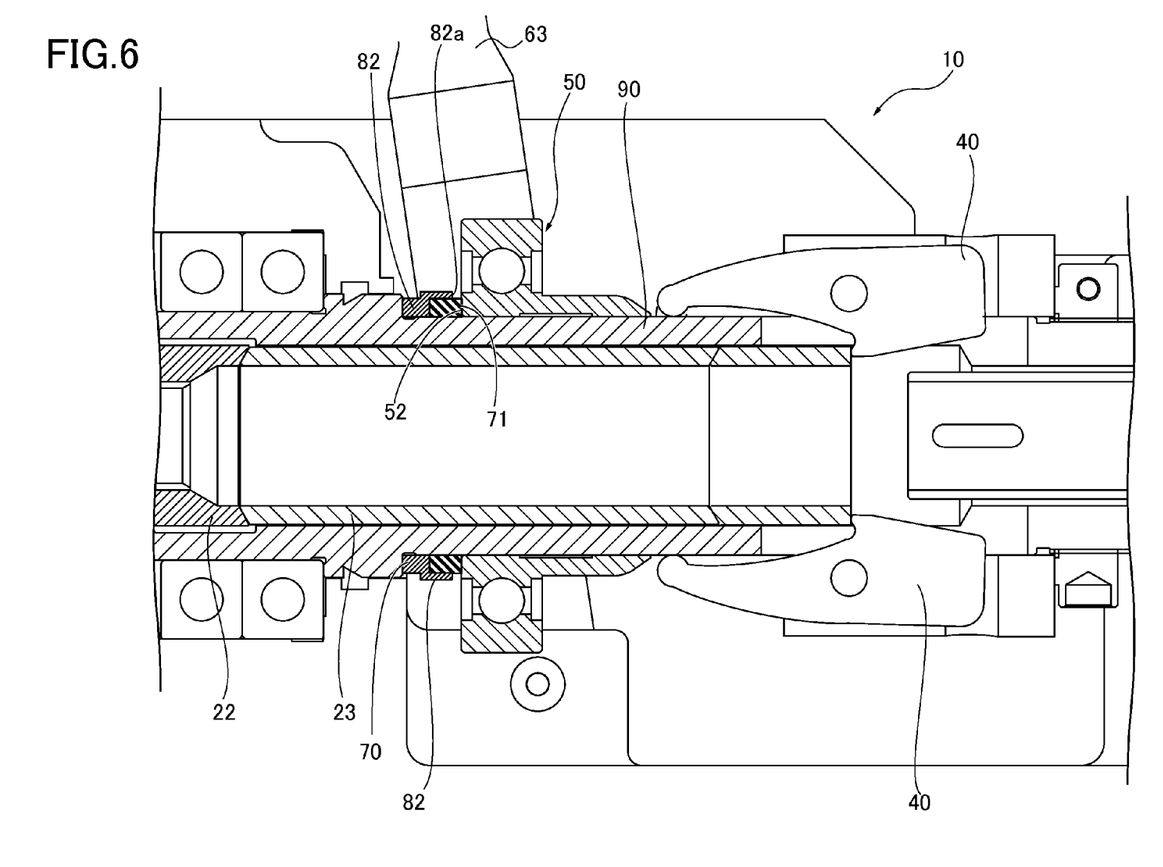
FIG. 6 is a sectional view illustrating a modified example (part 2) in which in an outward portion of an outer circumference of a rubber ring is covered by an outer circumference ring.

In such a step outer circumference ring 82, a relatively large inner diameter portion and outer diameter portion become portions which have the same effect and function as the above-described outer circumference ring 81. The outer circumference ring 82 can be fixed in the main spindle 90 through the relative large inner diameter portion and outer diameter portion. The step portion can be used as a wall which prevents the rubber ring 70 from being inadvertently moved in the axis direction M.

Similar to the outer circumference ring 81, it is also preferable for an end portion 82a of this outer circumference ring 82 to retract from the back end surface 71 of the rubber ring 70.

Moreover, the above-described chucking device 10 is a collet chuck configured to close the collet 21 (chuck workpiece 200) by displacing the sleeves 22, 23 in the axis direction M. However, the above-described chucking device 10 can be applied to a collet chuck having a drawbar instead of the sleeves 22, 23, and configured to close the collet with the main spindle 90 by displacing the drawbar in the axis direction M, and can be applied to a chucking device which chucks with a claw without using the collet chucking.

CROSS REFERENCE OF RELATED APPLICATION

The present application is based on and claims priority from Japanese Patent Application No. 2010-266375, filed on Nov. 30, 2010, the disclosure of which is hereby incorporated by reference in its entirety.

DESCRIPTION OF REFERENCE NUMERAL

10 Chucking device (fixing device)
20 Chuck section (fixing section)
21 Collet
22 First sleeve
23 Second sleeve
40 Chuck-actuating claw (actuating lever)
41 First end portion
42 Second end portion
50 Bobbin (Sliding member)
51 Cam surface
51a Tapered surface
51b Horizontal surface
52 Leading end surface
53 Inside portion
54 Outside portion
70 Rubber ring (rotation transfer member, elastic member)
71 Back end surface
90 Main spindle
91 Outer circumferential surface
200 Workpiece

The invention claimed is:
1. A fixing device of a workpiece in a machine tool comprising:
a fixing section configured to rotate with a main spindle, fix the workpiece in a closed state, and release the fixation of the workpiece in an open state;
an actuating lever configured to rotate with the main spindle, and be disposed to open and close the fixing section;
a sliding member which is provided to be movable between a first position and a second position along an axis direction of the main spindle, and configured to rotate with the actuating lever while displacing the actuating lever in contact with the actuating lever in the second position in the movable range; and
a rotation transfer member which is disposed to have contact with the sliding member in the first position in the movable range of the sliding member, and configured to rotate with the main spindle, wherein
the sliding member loosely engages with the main spindle in a rotatable manner, and rotates with the rotation transfer member when the sliding member has contact with the rotation transfer member in the first position of the movable range of the sliding member, and
the movable range of the sliding member has a range where the sliding member does not have contact with either the rotation transfer member nor the actuating lever such that a part of the sliding member that has contact with the actuating lever changes according to the rotation of the sliding member relative to the main spindle when the sliding member has contact with the actuating lever.

2. The fixing device according to claim 1, wherein the rotation transfer member is made of an elastic member, is elastically deformed by contact with the sliding member in the first position, and rotates the sliding member by a friction force resulting from an elastic force by the elastic deformation.

3. The fixing device according to claim 2, wherein the rotation transfer member is disposed to have contact with an outer circumferential surface of the main spindle, and a circular member which prevents or controls outward elastic deformation of the rotation transfer member is provided in an outside portion of an outer circumference of the rotation transfer member.

4. A machine tool including the fixing device according to claim 3.

5. A machine tool including the fixing device according to claim 2.

6. A machine tool including the fixing device according to claim 1.

\* \* \* \* \*